2,872,447

MANUFACTURE OF CYANURIC ACID

Herman Fred Oehlschlaeger, Jr., Cincinnati, Ohio, assignor to Emery Industries, Inc., Cincinnati, Ohio, a corporation of Ohio No Drawing. Application November 14, 1956
Serial No. 621,988

5 Claims. (Cl. 260—248)

This invention relates to the manufacture of cyanuric acid by the condensation of urea under the influence of heat.

Urea is known to react with itself with the liberation of ammonia to form the cyclic structure known as cyanuric acid. The reaction proceeds in accordance with the following equation:

$$3CO(NH_2)_2 \xrightarrow{\text{heat}} (N=C-OH)_3 + 3NH_3$$

The methods which heretofore have been employed for carrying out this reaction have included the simple heating of urea or the heating of urea with certain condensation agents such as zinc chloride or ammonium salts. Such reactions have been difficult to control and the yields have not been of the best due either to decomposition or to the formation of ammelide as a by-product.

It has also been suggested that this reaction be carried out by heating the urea in the presence of an inert liquid and a wetting agent. The inert liquid apparently acts as a heat transfer medium and provides a product in a granular rather than in a fused condition.

It is the purpose of this invention to provide a process which results in the production of cyanuric acid with the yield higher than has been possible with the previously known processes.

It is also the purpose of this invention to provide a process which will produce cyanuric acid of a greater degree of purity than has heretofore been attainable.

I have found that these benefits can be attained by heating urea in a solvent which will dissolve the urea but in which the cyanuric acid produced is insoluble. The reaction temperature should be between 130 and 220° C. in order that the reaction may be completed in a reasonable period of time. The solvents employed should therefore preferably boil within these temperature limits in order that the reaction may be carried out in a convenient manner without the application of pressure.

It is also necessary that the solvents used be chemically inert towards urea and cyanuric acid and any intermediate products which may result during the course of the reaction.

I have found that the solvents which comply with these requirements are those of the class of the N substituted lower acyl amides. Otherwise expressed, they are compounds of the type which may be designated by the type formula

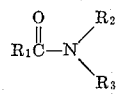

in which $R_1$ may be a hydrogen or a methyl or ethyl group and $R_2$ may be a hydrogen or an alkyl group containing from one to four carbon atoms and $R_3$ is an alkyl group containing from one to four carbon atoms.

Suitable solvents of this type include such compounds as dimethylformamide, dimethyl acetamide, and dibutylformamide. Other high boiling solvents may be used in a mixture with these solvents, for example, nitro benzene or trichlorobenzene provided the quantity used is not so great as to destroy the solubility of the mixed solvent for urea.

The reaction is carried out by dissolving the urea in a suitable solvent or mixture of solvents and heating to 130–220° C. from 4–6 hours or until substantially complete conversion of the urea to cyanuric acid is attained. The reaction is conveniently carried out by operating at the boiling point of the particular solvent, the solvent being retained in the reaction vessel by the use of a reflux condenser. During the course of the reaction the major portion of the cyanuric acid precipitates in a granular form and at the completion of the reaction may be removed by simple filtration and the solvent recovered for reuse. The precipitated cyanuric acid may be washed with a more volatile organic solvent to remove traces of the reacting solvent and/or with small quantities of cold water to affect the removal of other impurities.

As an alternative method, the reacting solvent may be removed by distillation, if necessary under reduced pressure, and the cyanuric acid recovered as a residue which may be further purified as indicated above.

It is difficult to select a solvent which is a good solvent for urea that does not have some solvent capacity either for cyanuric acid or the intermediate products of the reaction, for example, biuret. Therefore, when a solvent is used for the first time approximately 5% of the product or of intermediates may remain in the solvent. On reuse of the solvent the intermediate products which may be contained in it are converted to cyanuric acid and, being already saturated with cyanuric acid, further losses in the solvent are eliminated.

The amount of solvent required is not critical. The minimum quantity required is that which will produce a fairly fluid slurry when all of the cyanuric acid has been precipitated at the end of the reaction. The use of a greater quantity of solvent offers no advantage. Generally, the use of from 1 to 2 parts of solvent for each part of urea is sufficient.

My invention is further illustrated by the following examples:

Example No. 1

A mixture of 240 g. of urea and 240 g. of D. M. F. was heated and stirred for 6 hours at the reflux point of the mixture. The temperature fell from 171° C. at the beginning of the reaction, to 159° C. at the end. After approximately 1.5 hours, cyanuric acid began to precipitate as a fine granular material. The reaction mass was cooled, filtered and the precipitate washed with cold water and dried at 105° C. The yield was 145 g. of white material which analyzed 95.0% for cyanuric acid.

The filtrate from the reaction which contains some cyanuric acid and intermediate products may be reused for another run. In this case, the yield of cyanuric acid was usually in the order of 90–95% of theory.

Example No. 2

A solution of 30 g. of urea and 60 g. of dimethylacetamide was heated and stirred at the reflux point (170–175° C.) for 6 hours. After approximately 2 hours, a fine granular precipitate of cyanuric acid appeared. Most of the solvent was removed by distillation, and the residue was washed with cold water and dried at 105° C. The yield was 17.9 g.; representing 83.3% of theory. The material was a grainy, off-white material analyzing 98.5% as cyanuric acid.

Example No. 3

A mixture of 120 g. of urea, 120 g. D. M. F. and 120 g. trichlorobenzene was heated and stirred for 5 hours at the reflux temperature of the mixture. The urea all dissolved shortly after the mixture reached the reflux temperature of 173° C. After cooling, the cyanuric acid was obtained as a white granular precipitate which was easily collected by filtration. The precipitate was washed with a small amount of ether to remove residual solvent and dried at 105° C. The yield was 78 g. or 90.8% of theory.

From the examples cited it may be observed that the process of my invention results in the conversion of urea to cyanuric acid with yields of from 90–95% of theoretical. A yield of 90% is readily obtained and yields of as high as 95% can be obtained by more careful processing.

The purity of the cyanuric acid is generally 95% or even higher. The yields and the purity of the product obtained are substantially better than those claimed by processes of the prior art. We attribute our improved result to the use of a solvent medium which is a true solvent for the urea and an essentially non-solvent for the products of the reaction. The solvent therefore performs a function different from that of a mere heat transfer medium.

Having described my invention, I claim:

1. A process for the manufacture of cyanuric acid by the thermal treatment of urea which comprises admixing urea with a solvent having the type formula

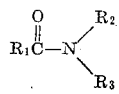

in which $R_1$ is a radical selected from the class consisting of hydrogen, ethyl, and methyl groups and $R_2$ is a radical selected from the class consisting of hydrogen and alkyl groups having one to four carbon atoms and $R_3$ is an alkyl radical having one to four carbon atoms, in quantity sufficient for the solvent to dissolve the urea, thereby forming a solution of the same in the solvent, and heating the said solvent solution at a temperature of from 130–220° C. for a period of from 4–6 hours thereby precipitating cyanuric acid from the solvent solution and then recovering the cyanuric acid precipitate from said solvent.

2. A process for the preparation of cyanuric acid from urea which comprises admixing urea with a liquid lower molecular weight N substituted acylamide in proportions to provide a solution of urea therein, heating the solution to a temperature of from 130–220° C. until substantially all of the dissolved urea is precipitated as cyanuric acid and then separating the cyanuric acid from said solvent.

3. A process for the preparation of cyanuric acid from urea which comprises dissolving urea in an equal weight of dimethylformamide and heating the solution to the boiling point of the solution for from 5–6 hours at a temperature sufficiently high to effect conversion of the dissolved urea into cyanuric acid which is insoluble in the said dimethylformamide and then separating the precipitated cyanuric acid from the dimethylformamide by filtration.

4. A process for the preparation of cyanuric acid from urea which comprises, forming a solution of urea in a solvent having the formula

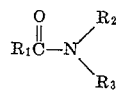

wherein $R_1$ is a radical selected from the class consisting of hydrogen, ethyl, and methyl groups, $R_2$ is a radical selected from the class consisting of hydrogen and alkyl groups having one to four carbon atoms, and $R_3$ is an alkyl radical having one to four carbon atoms, in which solvent cyanuric acid is substantially insoluble, heating the said solvent solution to a temperature of from approximately 130°–220° C. for a period of time sufficient to effect condensation of substantially all of the dissolved urea into cyanuric acid thereby forming a precipitate of cyanuric acid in the solvent, and then separating the precipitated cyanuric acid from the said solvent.

5. A process for the preparation of cyanuric acid from urea which comprises, forming a solution of urea in a solvent having the formula

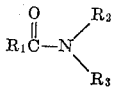

wherein $R_1$ is a radical selected from the class consisting of hydrogen, ethyl, and methyl groups, $R_2$ is a radical selected from the class consisting of hydrogen and alkyl groups having one to four carbon atoms, and $R_3$ is an alkyl radical having one to four carbon atoms, in which solvent cyanuric acid is substantially insoluble, the said solvent being in the proportion of one to two parts for each part of urea, heating the said solvent solution to a temperature of from approximately 130°–220° C. for a period of time sufficient to effect conversion of substantially all of the dissolved urea into cyanuric acid thereby forming a precipitate of cyanuric acid in the solvent, and then separating the precipitated cyanuric acid from the said solvent.

References Cited in the file of this patent

FOREIGN PATENTS

| | | |
|---|---|---|
| 506,070 | Canada | Sept. 28, 1954 |
| 726,290 | Germany | Aug. 27, 1942 |